(12) United States Patent
Ricci et al.

(10) Patent No.: US 11,757,346 B2
(45) Date of Patent: Sep. 12, 2023

(54) SINGLE INDUCTOR MULTIPLE OUTPUT SWITCHING CONVERTER AND METHOD TO CONTROL THE SAME

(71) Applicant: STMicroelectronics S.r.l., Agrate Brianza (IT)

(72) Inventors: Maurizio Ricci, Bergamo (IT); Marco Sautto, Zurich (CH); Simone Bellisai, Milan (IT); Eleonora Chiaramonte, Milan (IT); Luigi Arpini, Malnate (IT); Davide Betta, Barzano (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 49 days.

(21) Appl. No.: 17/370,674

(22) Filed: Jul. 8, 2021

(65) Prior Publication Data

US 2022/0021306 A1 Jan. 20, 2022

(30) Foreign Application Priority Data

Jul. 15, 2020 (IT) .................. 102020000017224

(51) Int. Cl.
*H02M 3/158* (2006.01)
*H02M 1/00* (2006.01)
(Continued)

(52) U.S. Cl.
CPC ......... *H02M 1/008* (2021.05); *H02M 1/0025* (2021.05); *H02M 3/156* (2013.01); *H02M 3/157* (2013.01); *H02M 3/158* (2013.01)

(58) Field of Classification Search
CPC .. H02M 3/158; H02M 3/1584; H02M 3/1586; H02M 3/1588; H02M 1/009; H02M 1/008; H02M 3/157
See application file for complete search history.

(56) References Cited

U.S. PATENT DOCUMENTS 6,603,361 B1 * 8/2003 Carobolante ...... G11B 20/1403
331/25
2013/0162228 A1 * 6/2013 Menegoli ............. H02M 3/158
323/267
(Continued)

FOREIGN PATENT DOCUMENTS

CN 110492738 A 11/2019
EP 3525342 A1 8/2019
KR 20160080835 A 7/2016

OTHER PUBLICATIONS

Bari, Syed, et al., "An Enhanced Adaptive Frequency Locked Loop for Variable Frequency Controls", IEEE Applied Power Electronics Conference and Exposition (APEC), Mar. 26, 2017, pp. 3402-3408.

(Continued)

*Primary Examiner* — Alex Torres-Rivera
(74) *Attorney, Agent, or Firm* — Slater Matsil, LLP

(57) ABSTRACT

An embodiment circuit comprises first and second output nodes with an inductor arranged therebetween, and first and second switches coupled to opposed ends of the inductor. The switches are switchable between non-conductive and conductive states to control current flow through the inductor and produce first and second output voltages. The current intensity through the inductor is compared with at least one reference value. Switching control circuitry is coupled with the first and second switches, the first and second output nodes, and current sensing circuitry, which is configured to control the switching frequency of the first and second switches as a function of the output voltages and a comparison at the current sensing circuitry. The switching control circuitry is configured to apply FLL-FFWD processing to produce the reference values as a function of a timing signal, targeting maintaining a constant target value for the converter switching frequency.

24 Claims, 7 Drawing Sheets

(51) Int. Cl.
    *H02M 3/156*     (2006.01)
    *H02M 3/157*     (2006.01)

(56) References Cited

U.S. PATENT DOCUMENTS

| | | | |
|---|---|---|---|
| 2014/0117960 A1 | 5/2014 | Boling | |
| 2015/0002197 A1* | 1/2015 | Chatterjee | H03L 7/095 |
| | | | 327/155 |
| 2017/0023959 A1* | 1/2017 | Chen | H02M 3/158 |
| 2017/0194857 A1 | 7/2017 | Hang et al. | |
| 2020/0403511 A1* | 12/2020 | Hashiguchi | H02M 1/0035 |

OTHER PUBLICATIONS

Lee, Kwang-Chan, et al., "A PLL-Based High-Stability Single-Inductor 6-channel Output DC-DC Buck Converter", Solid-State Circuits Conference Digest of Technical Papers (ISSCC), Feb. 9, 2010, 3 pages.

Su, Yi-Ping, et al., "CCM/GM Relative Skip Energy Control in Single-Inductor Multiple-Output DC-DC Converter for Wearable Device Power Solution", IEEE Asian Solid-State Circuits Conference, Nov. 10-12, 2014, 4 pages.

Wen, Yue, et al., "Analysis and Comparison of Frequency Stabilization Loops in Self-Oscillating Current Mode DC-DC Converters", IEEE Transactions on Power Electronics, vol. 28, No. 10, Oct. 2013, pp. 4753-4766.

Zheng, Yanqi, et al., "A Single-Inductor Multiple-Output Auto-Buck-Boost DC-DC Converter With Tail-Current Control", IEEE Transactions on Power Electronics, vol. 31, No. 11, Nov. 2016, pp. 7857-7875.

\* cited by examiner

SINGLE INDUCTOR MULTIPLE OUTPUT SWITCHING CONVERTER AND METHOD TO CONTROL THE SAME

CROSS-REFERENCE TO RELATED APPLICATIONS

This application claims the benefit of Italian Application No. 102020000017224, filed on Jul. 15, 2020, which application is hereby incorporated herein by reference.

TECHNICAL FIELD

The description relates to power management and conversion.

BACKGROUND

Power management and conversion is an area of extensive investigation and a number of different approaches have been proposed in the art in providing corresponding converters.

These conventional approaches may suffer from various drawbacks.

For instance, certain SIDO converters may exhibit a switching frequency which depends appreciably on the load applied to the outputs and induce undesired noise in the system sensitive bandwidth.

In certain converters resorting to operational transconductance amplifiers (OTAs), the switching frequency is be regulated in an open loop, which may turn out to be inadequate. Also, OTAs are analog blocks; this may result in an undesired amount of test time and resources involved for analog trimming, for instance, and in an appreciable amount of semiconductor area occupied by the OTA blocks.

SUMMARY

An object of one or more embodiments is to contribute in overcoming the drawbacks outlined in the foregoing.

According to one or more embodiments, such an object can be achieved by means of circuit having the features set forth in the claims that follow.

One or more embodiments may relate to a corresponding device. A hard disk drive (HDD) may be exemplary of such a device.

One or more embodiments may relate to a corresponding method.

The claims are an integral part of the technical teaching provided herein in respect of embodiments.

One or more embodiments can be applied to single-inductor dual-output (SIDO) switching converters or, more generally, to similar circuits regardless of the number of output channels.

One or more embodiments can be applied to hard disk drives (HDD) to provide supply voltages to piezo actuators for fine head positioning, for instance.

In one or more embodiments, the switching frequency of a converter (a SIDO converter, for instance) may be controlled acting on inductor current amplitude based on digital elaboration (processing) of feedback provided by a loop comparator, such feedback processing including frequency-locked-loop (FLL) processing to match a user-defined frequency, thus achieving a quasi-fixed frequency operation.

In one or more embodiments, a feedforward (FFWD) action may be advantageously implemented in order to improve transient response.

In one or more embodiments, controller actuation may include digital-to-analog converters (DACs) provided for each channel in order to apply digitally-computed thresholds to analog comparators.

One or more embodiments can be applied to multiple output converters replicating a basic structure.

One or more embodiments can be implemented with a single DAC converter multiplexing a plurality of thresholds.

BRIEF DESCRIPTION OF THE DRAWINGS

One or more embodiments will now be described, by way of example only, with reference to the annexed figures, wherein.

DETAILED DESCRIPTION OF ILLUSTRATIVE EMBODIMENTS

In the ensuing description, one or more specific details are illustrated, aimed at providing an in-depth understanding of examples of embodiments of this description. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment.

Moreover, particular conformations, structures, or characteristics may be combined in any adequate way in one or more embodiments.

The headings/references used herein are provided merely for convenience and hence do not define the extent of protection or the scope of the embodiments.

Figure 1:
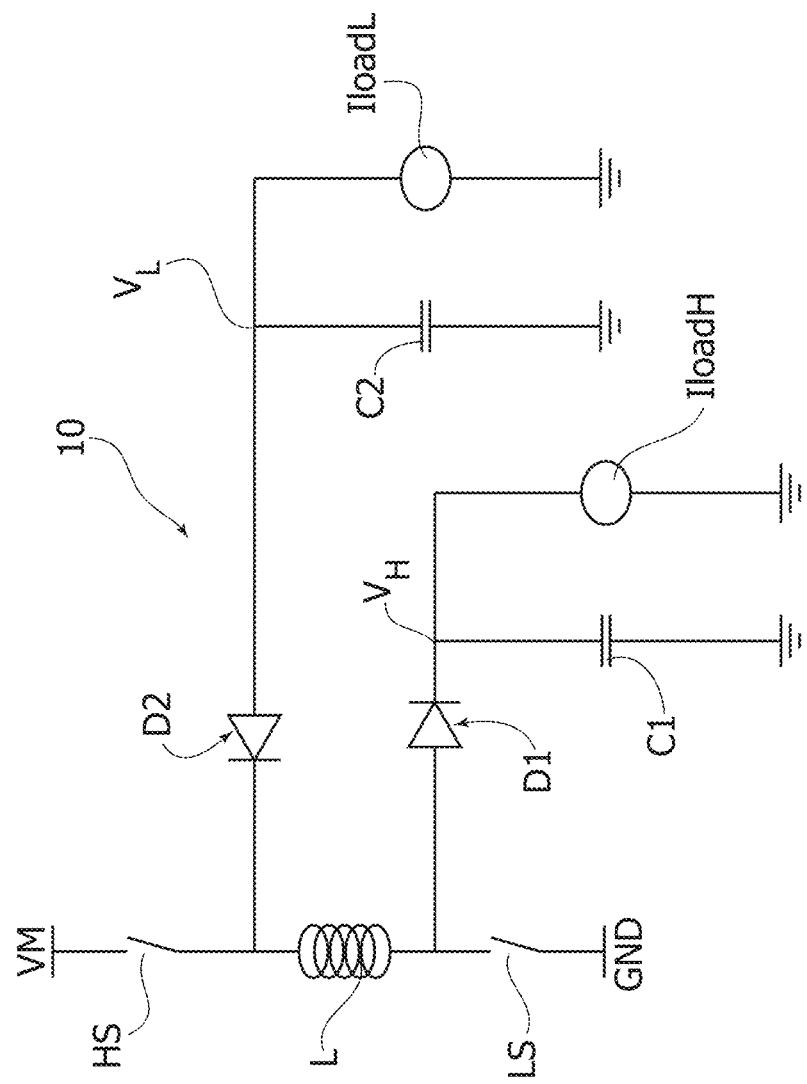
FIG. 1 is a circuit diagram of a simplified single-inductor dual-output (SIDO) converter structure.

FIG. 1 is a simplified representation, provided by way of introduction to the description of embodiments, of a single-inductor dual-output (SIDO) regulator 10.

Such a regulator 10 may include a (single) inductor L arranged in a current line from a supply input voltage or node VM and ground (power ground) GND.

As illustrated, the inductor L is arranged intermediate two switches (a "high-side" switch HS and a "low-side" switch LS). These switches may be implemented via electronic switches such as (power) metal-oxide-semiconductor field effect transistor (MOSFET) transistors, for instance.

As exemplified in FIG. 1, the regulator 10 can provide two independent output voltages VH and VL via two different diodes D1 and D2 coupled to the opposite ends of the inductor L.

As illustrated in FIG. 1, these may comprise:

a first diode D1 having its anode coupled between the inductor L and the low-side switch LS and configured to provide at its cathode an output voltage $V_H$ across a first (output) capacitor C1 and an output current IloadH to a first load, and a second diode D2 having its cathode coupled between the high-side switch HS and the inductor L and configured to provide at its anode an output voltage $V_L$ across a second (output) capacitor C2 and an output current IloadL to a second load.

It will be appreciated that, for the sake of simplicity, a same designation may be applied throughout this description to a certain node or line and a signal appearing/applied at the node or line.

Figure 2:
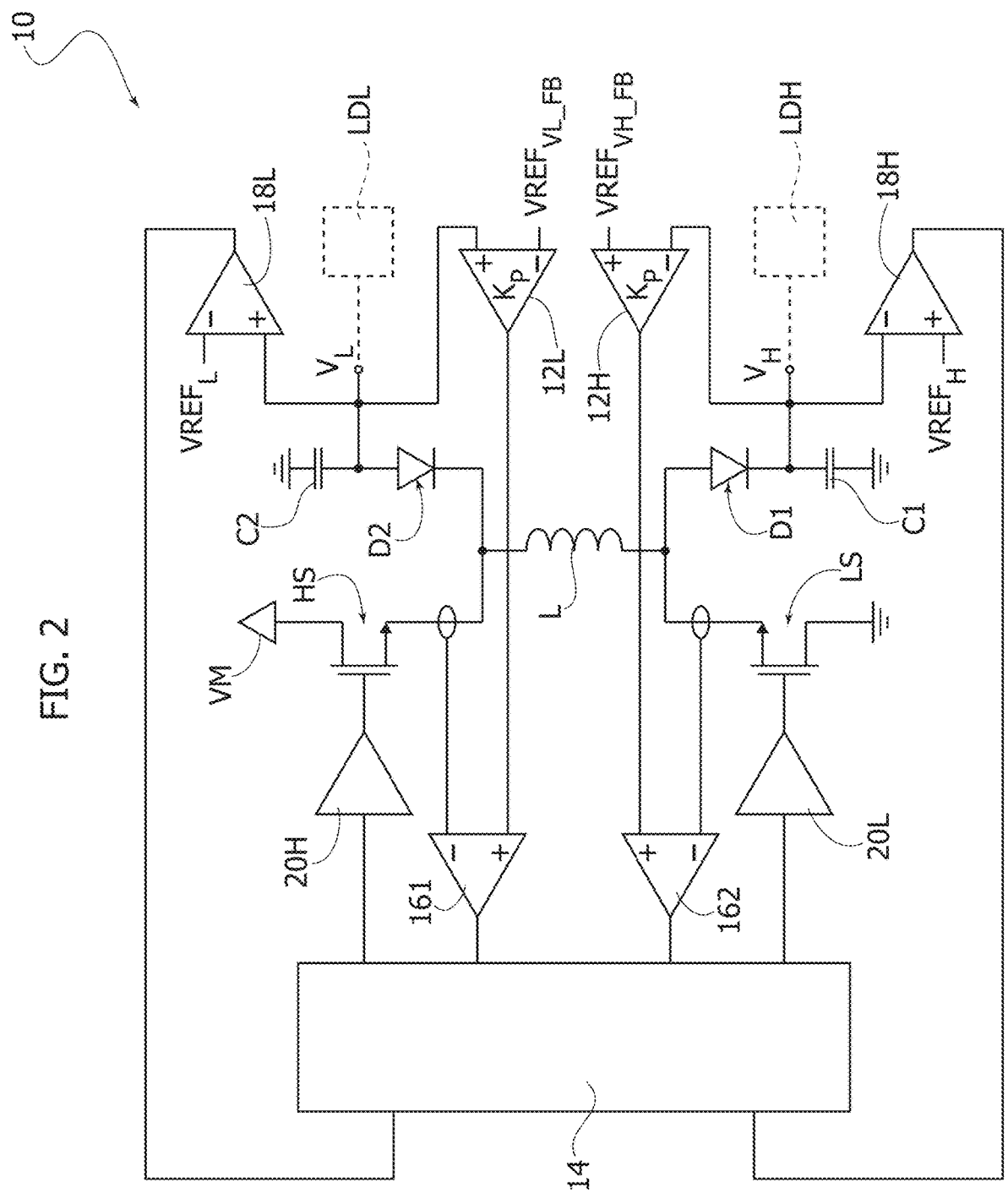
FIG. 2 is an exemplary circuit diagram of an internal SIDO structure based on operational transconductance amplifiers (OTAs)
Figure 3:
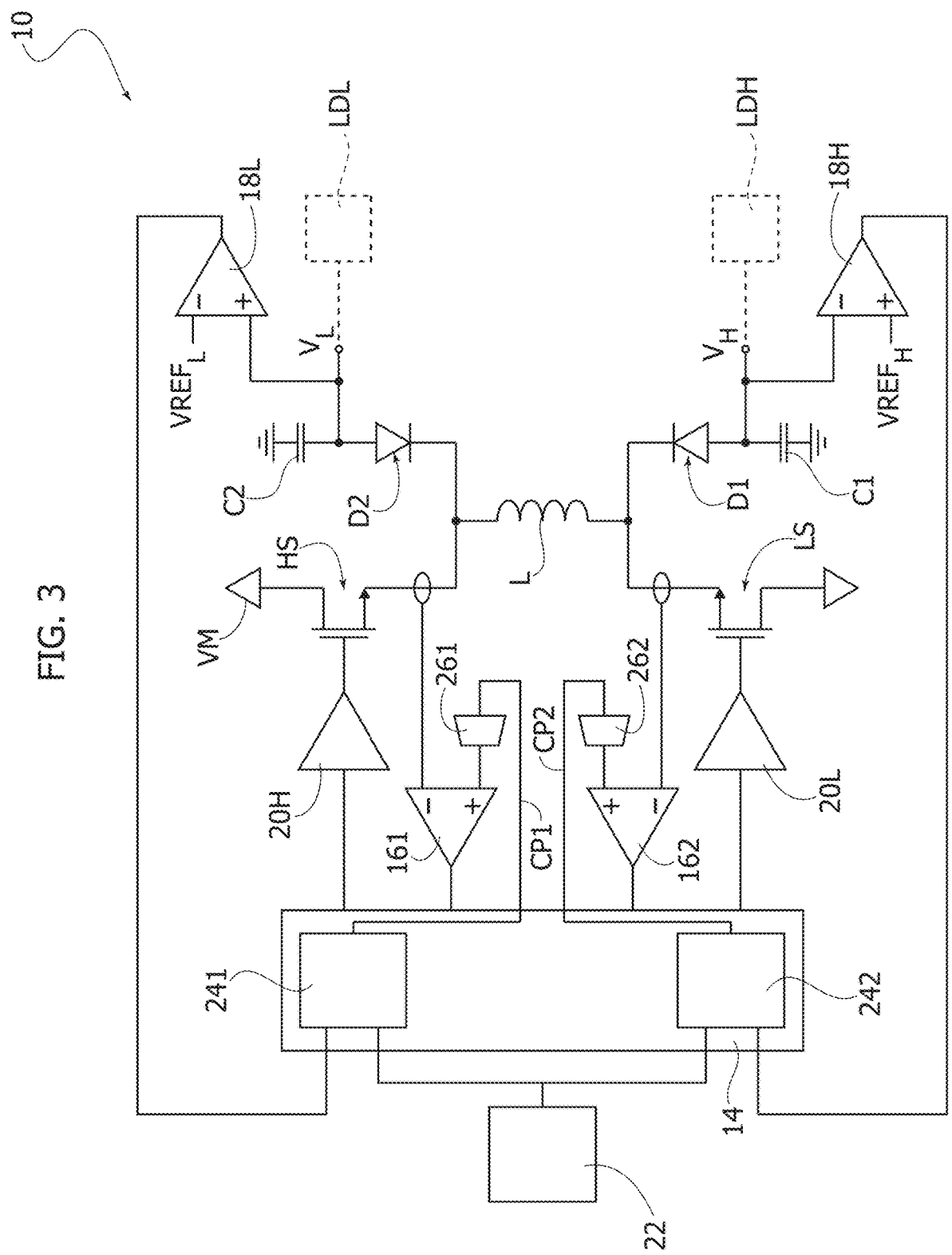
FIG. 3 is a circuit diagram of an internal SIDO structure exemplary of a combined frequency-locked-loop/feedforward (FLL+FFWD) approach underlying embodiments as per the present description.

The voltages $V_L$, $V_H$ as well the currents IloadL and IloadH are intended to be applied to respective loads LDL, LDH indicated in dashed lines in FIGS. 2 and 3. It will be appreciated that these loads may be distinct elements from the regulator 10, thus representing distinct elements from the embodiments.

The somewhat "crossed" arrangement and designations of parts in FIG. 1 is related to the fact that the "high" output voltage $V_H$ charged across C1 essentially results from current conduction through the inductor L and the diode D1 when the high-side switch HS couples the inductor L to VM, while the "low" output voltage $V_L$ charged across C2 essentially results from current conduction through the inductor L and the diode D2 when the low-side switch LS couples the inductor L to ground GND.

Operation of a SIDO regulator 10 as illustrated in FIG. 1 may involve boost/buck-boost operation and rely on a peak (or peak-valley) current comparator.

For instance, a voltage loop can be provided to constantly monitor the output voltages $V_L$ and $V_H$ and compare them with two reference values.

When one of the two outputs is sensed to be out of regulation, a control logic may turn on—that is make conductive—both power MOSFETs HS and LS until the current through the inductor L reaches a peak value. Then, according to which one of the outputs ($V_L$ or $V_H$) is sensed to be out of regulation, one of the two power switches HS or LS is turned off—that is made non-conductive—so that the current through the inductor L supplies (that is, exchanges charge with) the output capacitance C1 or C2 found to be out of regulation by flowing through one of the two diodes D1 or D2.

That is such a regulator operates on the principle of charging the inductor L to a fixed current level and transferring resulting inductor energy to one of the two outputs ($V_L$ or $V_H$) each switching cycle. A fixed peak inductor current threshold can be selected to support rated output power, so that energy is delivered to the output each switching cycle. A peak current/minimum off-time control circuit may be used to control the amount of time the charging cycle of the inductor is turned off.

In a converter as per the general layout illustrated in FIG. 1, a peak current through the inductor L can be limited comparing a scaled version of the low-side switch current against a fixed threshold level.

It is otherwise noted that, when the output of the current comparator is high (peak value reached), the inductor current starts to decrease. Having a fixed peak current value can result in a highly variable switching frequency which depends on the load applied to the outputs.

As a consequence, SIDO converters can induce undesired noise in the system sensitive bandwidth in that switching may occur in a frequency band that produces acoustic emissions. These can be annoying to humans and can also be the source of nuisance for other device components such as sensors and the like.

Certain conventional solutions (as disclosed, for instance, in US 2014/0117960 A1) resort to operational transconductance amplifiers (OTAs).

One exemplary OTA-based arrangement is illustrated in FIG. 2, where parts or elements like parts or elements already discussed in connection with FIG. 1 are indicated with like reference symbols, so that a corresponding description will not be repeated for brevity.

Such a general approach, aimed at avoiding unnecessary repetitions, will be applied to all of the annexed figures discussed in the following.

An OTA-based SIDO converter 10 as illustrated in FIG. 2 comprises two operational transconductance amplifiers 12L, 12H that act on a control logic circuitry 14 in order to modify the (peak) current though the inductor L as a function of the negative and positive output voltages $V_L$ and $V_H$.

As illustrated in FIG. 2, each OTA 12L, 12H produces a current which is a function (proportional) to the SIDO output voltage drops of $V_L$ and $V_H$ with respect to corresponding reference values $VREF_{VL\_FB}$ and $VREF_{VH\_FB}$. In that way, any change in the output regulated voltages due to (a variation in) an applied load such as LDL or LDH is detected by the OTAs 12L, 12H that vary their output current.

The output currents from the OTAs 12L, 12H are compared at current comparators 161, 162 with the current intensities through the power switches HS, LS (as sensed via a "SenseFET", namely a scaled replica of the respective power FET, for instance) to provide corresponding feedback information to the control logic circuitry 14.

As illustrated in FIG. 2, the control logic circuitry 14 which alternately switches HS and LS on (conductive) and off (non-conductive) as discussed previously is also sensitive to variations of $V_L$ and $V_H$ with respect to corresponding reference values $VREF_L$ and $VREF_H$ as sensed by voltage comparators 18L and 18H: such an arrangement implements a voltage loop to constantly monitor the output voltages $V_L$ and $V_H$ and act to restore regulation as discussed previously in connection with FIG. 1.

References 20H and 20L in FIG. 2 indicate two driver stages that couple the control logic circuitry 14 with the control terminals (gates, in the case of field-effect transistors such as MOSFET transistors) of the switches HS and LS in order to drive these switches as discussed.

In a conventional SIDO converter 10 based on an OTA structure as illustrated in FIG. 2, the peak current through the inductor 10 can be limited by comparing, e.g. at 162, a scaled version of the low-side power current with the current coming from one of the OTAs (e.g. 12H): in that way, a higher output load results in a higher output voltage drop, a higher OTA current and a higher inductor peak current value, while the switching frequency remains substantially constant.

The peak inductor current can be limited in the same manner by comparing, e.g. at 161, a scaled version of the (high-side) power current with the current coming from the other of the OTAs (e.g. 12L).

As illustrated in FIG. 2, the two channels (high-side, low-side) may have independent loads and two loops are implemented using 12L and 12H in order to continuously monitor the output voltage drop for each channel applying adequate current thresholds at two comparators 161, 162.

As an alternative, an analog multiplexer can be provided in order to multiplex two outputs from 12L and 12H onto a single comparator in the place of the two comparators 161 and 162.

A conventional SIDO converter 10 based on an OTA structure as illustrated in FIG. 2 may suffer from various drawbacks.

In the first place, the switching frequency is not regulated in a loop closed on a reference frequency: as illustrated, the switching frequency is regulated in an open loop, by changing the peak current according to an output voltage drop caused by the load.

Also, OTAs are analog blocks: this may lead to a considerable amount of test time and resources involved (in analog trimming, for instance).

In addition, OTAs may take an appreciable amount of semiconductor (silicon) area: 60020 µm2 may be an exemplary figure for two OTA blocks.

It is noted that the limitations of an OTA-based solution as illustrated in FIG. 2 may be overcome if the switching frequency of the logic control circuitry 14 is regulated in a closed loop via a frequency-locked-loop (FLL) architecture.

Such an approach can also address the issue of analog complexity and associated semiconductor area insofar as it may rely on a solution which is almost entirely digital.

Also, it is noted that adding a feedforward (FFWD) path facilitates providing an adequate load transient response and limiting the voltage drop to a value comparable with the value which can be achieved in OTA-based structures.

Figure 4:
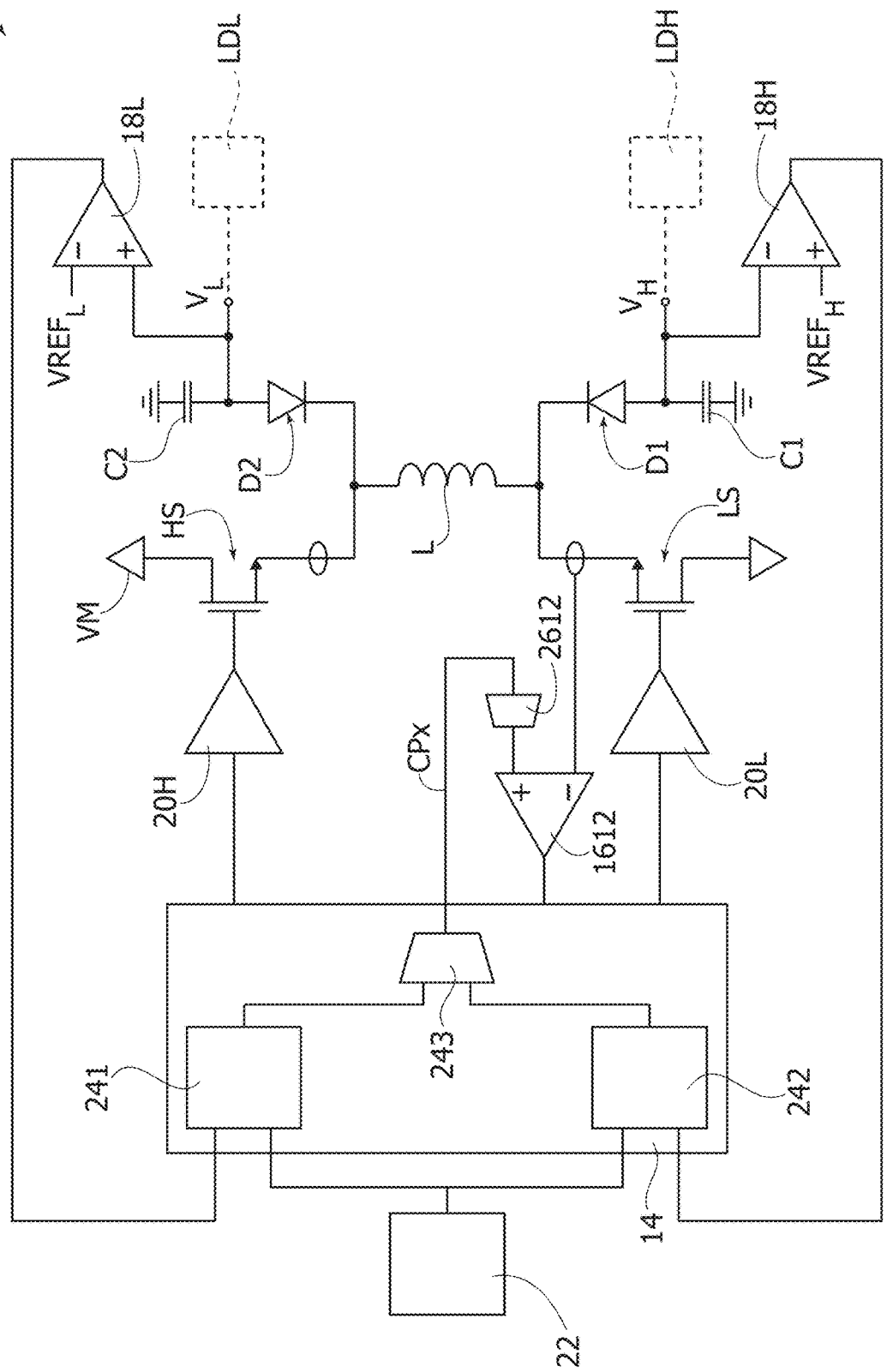
FIG. 4 is circuit diagram exemplary of a possible alternative combined FLL+FFWD approach underlying embodiments as per the present description.

To that effect, one or more embodiments as exemplified in FIGS. 3 and 4 involve processing loop comparator information in order to produce a digital feedback signal, so that the analog signal produced by an OTA can be effectively replaced by resorting to FLL circuitry.

Once again, for the sake of brevity, parts or elements like parts or elements already discussed in connection with FIGS. 1 and 2 are indicated with like reference symbols in figures such as FIGS. 3 and 4 without repeating a corresponding description.

Embodiments as exemplified in FIGS. 3 and 4 may comprise a reference clock source 22 (of any type known to those of skill in the art) configured to provide a reference clock signal to two circuits 241, 242 in the logic control circuitry 14 which are also sensitive to the output signals from the comparators 18L and 18H.

Figure 6:
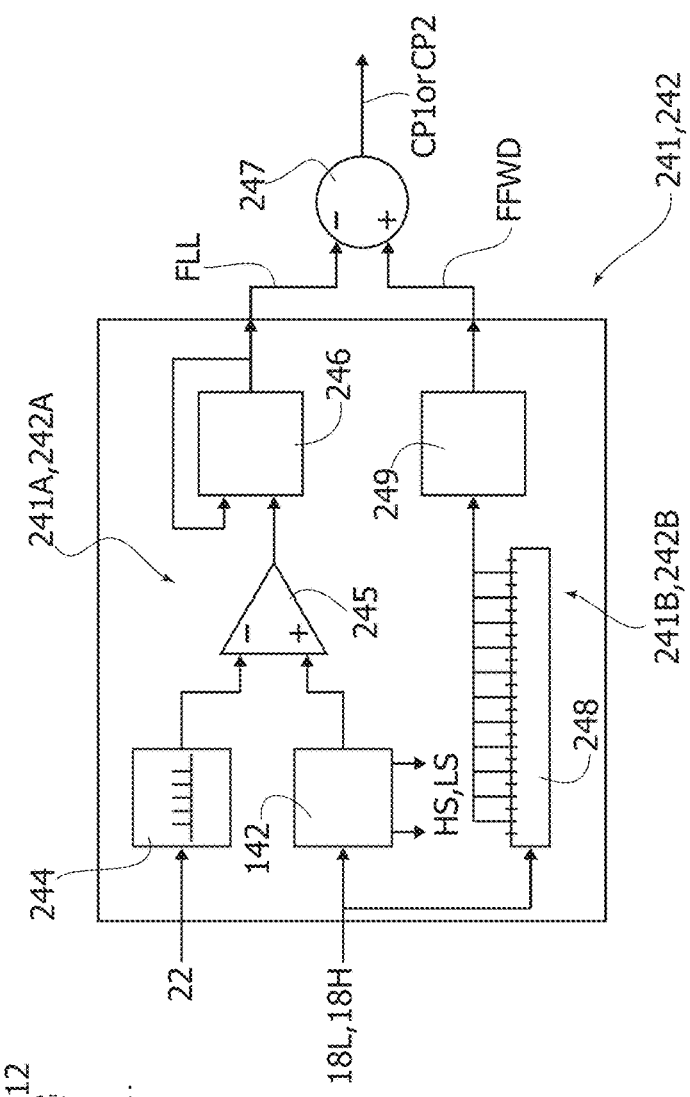
FIG. 6 is an exemplary block diagram of single channel feedback processing.
Figure 5:
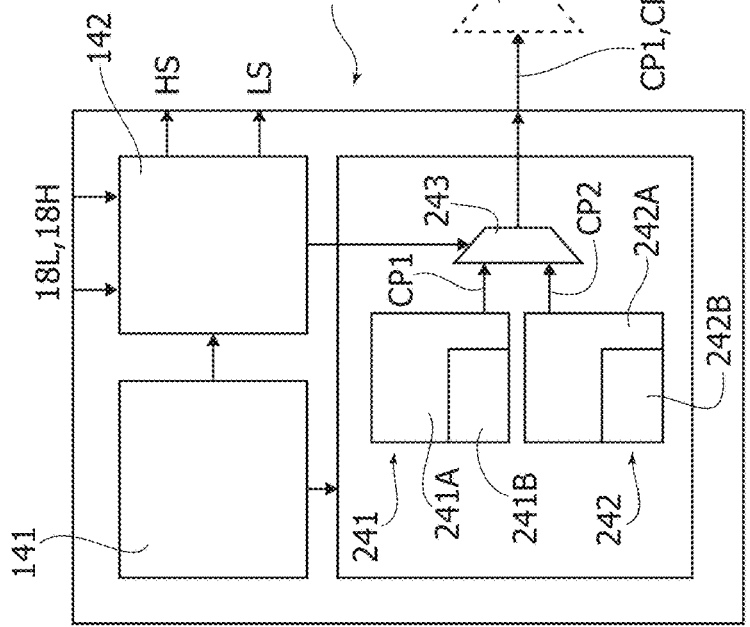
FIG. 5 is an exemplary block diagram of a SIDO circuit according to embodiments as per the present description.

In one or more embodiments as exemplified herein, the circuits 241, 242 may comprise frequency-locked-loop (FLL) circuits (designated 241A and 242A in FIGS. 5 and 6) which may advantageously incorporate a feedforward (FFWD) action (designated 241B and 242B in FIGS. 5 and 6).

In embodiments as exemplified in FIGS. 3 and 4, the output signals CP1, CP2 from the FLL/FFWD circuits 241, 242 are converted to analog via digital-to-analog converters (DACs) 261, 262 and supplied to the comparators 161, 162 in the place of the output signals from the OTAs 12L and 12H in FIG. 2.

As discussed in the following, CP1 and CP2 may be digital feedback signals resulting from processing a timer signal which may be derived from the clock signal from the clock source 22 and the "binary" outputs from the comparators 18L and 18H.

In embodiments as exemplified in FIG. 3, these digital feedback signals (converted to analog at 261, 262) can be used to control the peak current through the inductor L as discussed previously.

For instance, the peak current through the inductor L can be limited by comparing (at 162) a scaled version of the current through the low-side power switch LS against a threshold voltage now generated by the DAC 262.

The peak current through the inductor L can be likewise limited by comparing (at 161) a scaled version of the current through the high-side power switch HS against a threshold voltage now generated by the DAC 261.

As discussed previously in connection with FIG. 2, the two channels (high-side, low-side) may have independent loads LDL, LDH and two loops are implemented using 161, 261 and 162, 262 in order to continuously monitor the output voltage drop for each channel applying adequate current thresholds at the two comparators 161, 162.

For instance, in the presence of a low-to-high load transition, the regulator frequency tends to rise: the circuits 241, 242 detect such a frequency variation and change the DAC words at 261, 262 in order to produce higher threshold currents. This translates into higher peak current values, which in turn results into a reduction of the regulator switching towards a target frequency (as set via the clock source 22, for instance).

In embodiments as exemplified in FIG. 4, these loops may be partially merged providing a (single) common DAC 2612 which supplies a (single) current comparator 1612. In embodiments as exemplified in FIG. 4, the DAC 2612 is supplied with a signal CPx which results from multiplexing the signals CP1, CP2 at a multiplexer 243 as discussed in the following. It is noted that, in comparison with embodiments as exemplified in FIG. 3, embodiments as exemplified in FIG. 4 may involve faster DAC and comparator circuitry, while offering the advantage of a reduced semiconductor area.

In embodiments as exemplified in FIGS. 3 and 4, thanks to the circuits 241, 242 the inductor peak current can change according to the output load transition, with the regulator switching frequency maintained substantially constant (as illustrated in the following, in connection with FIG. 7B, for instance).

In embodiments as exemplified in FIGS. 3 and 4, the highest (maximum) regulator frequency is selected to be higher than a target frequency $f_{target}$ set in the circuits 241, 242.

The diagram of FIG. 5 is a higher-level exemplary representation of a possible architecture of logic control circuitry 14 in one or more embodiments.

In FIG. 5 reference 141 indicates a startup control circuit that controls the initial startup of the regulator and subsequently activates a main (voltage loop) control module 142 configured to control (via the drivers 20H, 20L, for instance) the high-side and low-side switches HS and LS as a function of the signals from the loop comparators 18L and 18H.

Operation of such a voltage control loop is essentially as discussed in the introductory portion of this detailed description.

In embodiments as exemplified in FIG. 5, the startup control circuit 141 also activates a current limiting module which includes the circuits 241 and 242 configured to limit the inductor peak current to a lower value only during the startup of the regulator taking into account actual channel information as provided by the main (voltage loop) control module 142.

For the sake of simplicity and ease of understanding, FIG. 5 refers to embodiments as exemplified in FIG. 4, namely embodiments where a (single) DAC 2612 is supplied with a signal CPx which results from multiplexing at a multiplexer 243 the signals CP1 and CP2.

FIG. 6 is a circuit diagram exemplary of possible embodiments of a digital controller configured to produce the signals CP1 or CP2 to be supplied distinctly to the DACS 261, 262 and on to the comparators 161, 162 of FIG. 3 or to the multiplexer 2612 and on to the comparator 1612 of FIG. 4.

The circuit diagram of FIG. 6 may correspond to either of 241 or 242, assumed to be identical for simplicity: this is exemplified by the two portions of FIG. 6 being referenced as 241A, 242A (frequency-locked-loop or FLL processing) and 241B, 242B (feedforward or FFWD processing), respectively.

Considering first the frequency-locked-loop or FLL processing section 241A, 242A, in one or more embodiments a target switching frequency $f_{target}$ for the main controller 142 may be characterized by a user-defined waveform, as produced by a programmable timer 244, which may be clocked by a clock source such as 22.

In one or more embodiments as exemplified in FIG. 6, such a reference frequency from the timer 244 can be compared at a comparator 245 with an effective switching frequency produced by the main controller 142 as a function of the loop comparator signals from 18H and 18L. The frequency error resulting from the comparison at 245 may be integrated (in an internal register 246, for instance) and provided to an output node 247.

The integral value thus generated, labeled FLL in FIG. 6, can be supplied to a DAC in order to provide a reference for a current peak comparator.

As discussed, the DAC in question may be either one of the DACs 261 or 262 in FIG. 3 or a single DAC 2612 to which signals CP1, CP2 are multiplexed as exemplified at 243 in FIG. 4 and FIG. 5.

Likewise, the current peak comparator may be either one of the comparators 161 or 162 in FIG. 3 or a single comparator 1612 as exemplified in FIG. 4.

As discussed, this latter arrangement provides multiple output values replicating a same architecture for each output channel, which facilitates managing various load schemes for multiple output regulators.

Figure 7A:
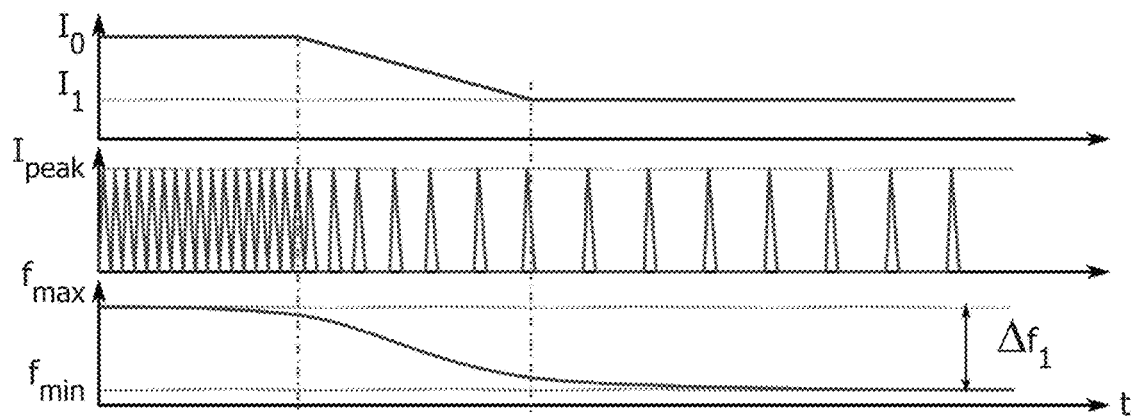
FIG. 7A reproduces time diagrams exemplary of signals occurring in fixed-current peak SIDO switching activity with load change.
Figure 7B:
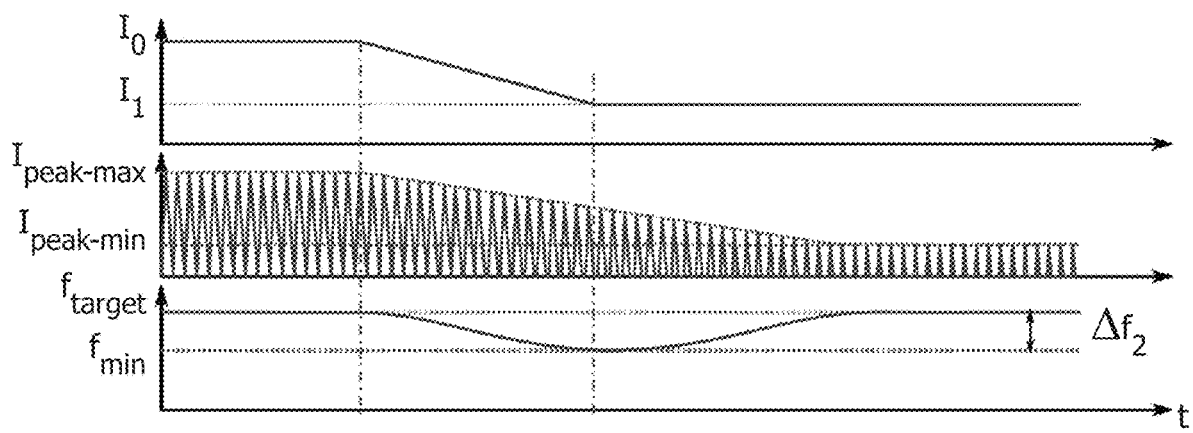
FIG. 7B reproduces time diagrams exemplary of signals occurring in fixed-frequency SIDO switching activity with load change.

Frequency-locked-loop (FLL) operation as exemplified herein can adequately match a desired switching frequency thanks to an error integrator such as 246 placed on the frequency loop as illustrated in FIGS. 7A and 7B.

These diagrams represent against common time scales (abscissa scale) t and with reference with a possible load current drop from I0 to I1 (upper curves in FIGS. 7A and 7B), possible behaviors of the peak current $I_{peak}$ and the switching frequency (second and third curves in FIGS. 7A-7B) in:

a conventional fixed current peak SIDO (FIG. 7A), and
a fixed-frequency SIDO according to embodiments (FIG. 7B).

It is noted that, in a conventional fixed current peak SIDO, load current drop from I0 to I1 results in a (steady) frequency drop $\Delta f_1$ from $f_{max}$ to $f_{min}$.

Conversely, a quasi-fixed-frequency SIDO operation according to embodiments, where maintaining a constant value ($f_{target}$) for the switching frequency is targeted, exhibits a smaller frequency drop $\Delta f_2$ from $f_{target}$ to $f_{min}$, which is recovered as a result of the peak current being reduced from a first value $I_{peak-max}$ to a second value $I_{peak-min}$.

It is likewise noted that this solution involves a certain time in settling to the correct DAC word: that is, it may act only once per switching cycle, which may result, for instance, in an undesired voltage drop in the presence of a sudden load increase.

Figure 8A:
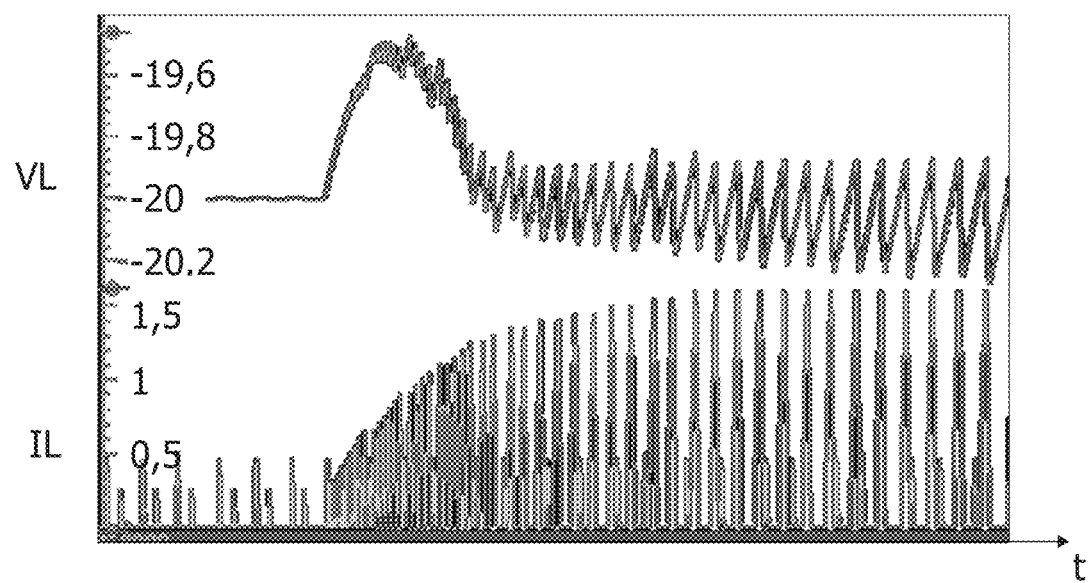
FIG. 8A reproduces time diagrams exemplary of a voltage drop which may be experienced in embodiments with FLL processing.

This point may deserve consideration insofar as certain applications may be faced with an unpredictable load behavior, which may trigger undervoltage faults as a result of transient responses which may cause temporary output voltage drops as exemplified in the diagram of FIG. 8A.

This diagram represents against a common time scale (abscissa scale) t possible behaviors of an output voltage Vn (upper curve) and a load current IL (lower curve) in a converter 10 according to embodiments where the circuits 241, 242 implement (only) FLL processing.

Figure 8B:
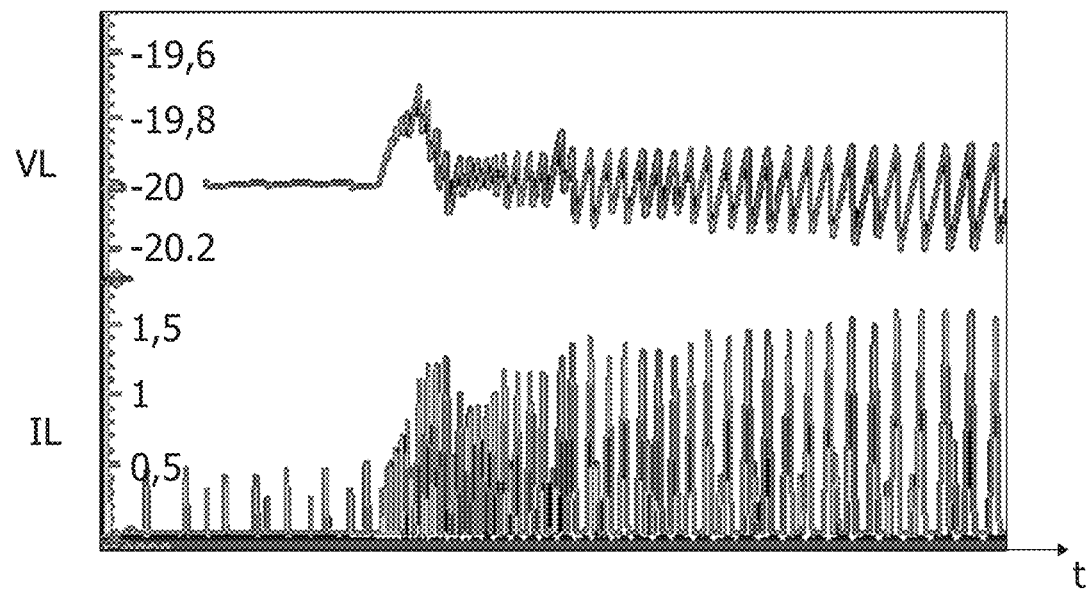
FIG. 8B reproduces time diagrams exemplary of a voltage drop which may be experienced in embodiments with FLL+FFWD processing.

The diagram of FIG. 8B likewise represents against a common time abscissa scale t corresponding behaviors of an output voltage VL and a load current IL in a converter 10 according to embodiments where the circuits 241, 242 implement, in addition to FLL processing, also feedforward (FFWD) processing as exemplified at 241B and 242B in FIG. 5 (where 241A and 242A are representative of FLL processing) and FIG. 6.

In one or more embodiments FFWD action may be introduced to improve transient response.

The feedback information used to calibrate this action may still be based on loop comparator feedback (from 18H, 18L, for instance), so that when working at steady state a regulator 10 can recover an output undervoltage restoring the loop comparator rest condition.

It is noted that, in driving a low load, FLL action forces a minimum current peak value in order to keep the switching frequency near a desired target value.

Under these circumstances, a sudden load increase will result in multiple loop comparator requests and a delay in FLL response may result in low current pulses being insufficient to sustain an output load.

In certain applications, this may result in the loop comparator(s) being brought to heavy undervoltage conditions, with a possible resulting increase in the duty cycle (even to 100%).

A feed-forward or FFWD action as exemplified herein facilitates taking into account inter-cycle conditions, thus supporting FLL action (which acts once per switching cycle) in its inability to deal with heavy undervoltage conditions (such as those possibly caused by a transient response or long service cycles on the "opposite" channel).

As exemplified in FIG. 6, FFWD action can be implemented via a shift register 248 which stores the loop comparator state (from 18L or 18H) during the latest switching cycle.

As exemplified in FIG. 6, an adder 249 can be coupled to the shift register 248 to count the number of occurrences of an undervoltage conditions stored in the shift register 248 and apply to the output node 247 producing the current peak control signal CP1 or CP2 a feed forward signal FFWD which is combined with the FLL signal in order to support the FLL action.

Once steady-state conditions are recovered, the loop comparator(s) 18L, 18H may rapidly recover from undervoltage, with feed-forward action automatically discontinued as a result as the number of occurrences of an undervoltage conditions stored in the shift register 248 dropping to zero.

A circuit (for instance, 10) as exemplified herein may comprise:

at least one pair of output nodes (for instance, $V_L$, $V_H$), the pair of output nodes comprising a first output node (for instance, $V_L$) and a second output node (for instance, $V_H$) with an inductor (for instance, L) arranged intermediate therebetween, current drive circuitry (for instance, HS, LS, D1, D2) comprising a first switch (for instance, HS) and a second switch (for instance, LS) coupled to opposed ends of the inductor, the first switch and the second switch switchable between a non-conductive state and a conductive state to control current flow through the inductor and produce a first output voltage at the first output node and a second output voltage at the second output node, current sensing circuitry sensitive to the current intensity through the inductor and configured to compare (for instance, 161, 162; 1612) the current intensity sensed with at least one reference value (for instance, CP1, CP2, which can be multiplexed at 243 to provide CPx), switching control circuitry (for instance, 14) coupled (for instance, via 20H, 20L) with the first switch and the second switch, with the first output node and the second output node, as well as with the current sensing circuitry, the switching control circuitry configured to control (for instance, 20H, 20L) a switching frequency (for instance, $f_{target}$) of the first switch and the second switch between the non-conductive state and the conductive state as a function of the first output voltage at the first output node, the second output voltage at the second output node and the result of comparing (for instance, at 161, 162; 1612) the current intensity sensed with the at least one reference value, wherein the switching control circuitry comprises a timer circuit (for instance, 22, 244) configured to produce a timing signal with a timing frequency, the switching circuitry configured (for instance, 241, 242) to process (for instance, 245, 246) the timing signal and produce the at least one reference value as a function of the timing signal from the timer circuit targeting (that is having as a target) maintaining a constant value (for instance, $f_{target}$) for the switching frequency.

In a circuit as exemplified herein, the timer circuit may comprise a programmable timer circuit (for instance, 244) configured to produce the timing signal with a selectively variable timing frequency.

In a circuit as exemplified herein:

the switching control circuitry may comprise processing circuitry (for instance, 241, 242) configured (for instance, 245, 246) to process the timing signal digitally, and the circuit may comprise digital-to-analog converter circuitry (for instance, 261, 262; 2612) to supply to the current sensing circuitry (for instance, 161, 162; 1612) the at least one reference value (for instance, CP1, CP2) converted to analog.

In a circuit as exemplified herein, the switching control circuitry is configured (for instance, 241, 242) to produce the at least one reference value via frequency-locked-loop processing (for instance, 241A, 242A, 245, 246) of the timing signal from the timer circuit.

In a circuit as exemplified herein, the switching control circuitry may be configured to produce the at least one reference value via frequency-locked-loop processing comprising:

receiving (for instance, 142) a switching frequency value to switch the first switch and the second switch between the non-conductive state and the conductive state as a function of the first output voltage at the first output node and the second output voltage at the second output node, comparing (for instance, 245) the switching frequency value with the timing frequency of the timing signal and producing a frequency error value, integrating (for instance, 246) the frequency error value, and producing (for instance, 247) the at least one reference value as a function of the integrated frequency error value.

In a circuit as exemplified herein, the switching control circuitry may be configured to produce the at least one reference value via frequency-locked-loop processing of the timing signal from the timer circuit combined (for instance, 247) with feedforward processing (for instance, 248, 249) of the first output voltage at the first output node and the second output voltage at the second output node.

In a circuit as exemplified herein, the feedforward processing may comprise producing during a cycle of the switching frequency of the first switch and the second switch between the non-conductive state and the conductive state, a count (for instance, via 248 and the adder 249) of undervoltage events wherein the first output voltage at the first output node and the second output voltage at the second output node are under respective voltage references (for instance, $VREF_L$, $VREF_H$), producing (for instance, 247) the at least one reference value as a function of the integrated frequency error value and the count (for instance, from the adder 249).

In a circuit as exemplified herein, the switching control circuitry may be is configured to:

produce as a function of the timing signal from the timer circuit a first reference value (for instance, CP1) and a second reference value (for instance, CP2) for comparison with the current intensity sensed in the inductor, control (for instance, via 20H, 20L) the switching frequency of the first switch and the second switch between the non-conductive state and the conductive state as a function of the first output voltage at the first output node, the second output voltage at the second output node and the result of comparing the current intensity sensed with the first reference value and the second reference value.

In a circuit as exemplified herein, the switching control circuitry may comprise a first processing branch (for instance, 241A, 241B) configured to produce the first reference value (for instance, CP1) as a function of the timing signal from the timer circuit and a second processing branch (for instance, 241A, 241B) configured to produce the second reference value (for instance, CP2) as a function of the timing signal from the timer circuit, and either one of:

a) a first signal propagation path (for instance, 261) to apply to the current sensing circuitry the first reference value (for instance, CP1) for comparison (for instance, 161) with the current intensity through the inductor and a second signal propagation path (for instance, 262) to apply to the current sensing circuitry the second reference value (for instance, CP2) for comparison (for instance, 162) with the current intensity through the inductor, or, alternatively b) a common signal propagation path (for instance, 2612) to apply to the current sensing circuitry for comparison (for instance, 1612) with the current intensity through the inductor the first reference value (for instance, CP1) alternated (for instance, via multiplexing at 243) with the second reference value (for instance, CP2).

In a circuit as exemplified herein, the signal propagation path or paths comprise digital-to-analog converter circuitry (for instance, 261, 262; 2612) to supply the current sensing circuitry (for instance, 161, 162; 1612) with analog-converted signals.

A device as exemplified herein may comprise:
a circuit (10) as exemplified herein, and
at least one pair of electrical loads (for instance, LDL, LDH) coupled to the first output node (for instance, $V_L$) and to the second output node (for instance, $V_H$), respectively.

A method of operating a circuit or a device as exemplified herein, wherein the current drive circuitry (for instance, HS, LS, D1, D2) has an upper frequency bound in switching the first switch and the second switch between a non-conductive state and a conductive state to control current flow through the inductor, may comprise setting the timing frequency of the timing signal (for instance, 244) lower than the upper frequency bound.

Without prejudice to the underlying principles, the details and embodiments may vary, even significantly, with respect to what has been described by way of example only without departing from the extent of protection.

The extent of protection is determined by the annexed claims.

What is claimed is:

1. A first circuit, comprising:
   at least one pair of output nodes, the pair of output nodes comprising a first output node and a second output node with an inductor arranged intermediate therebetween;
   current drive circuitry comprising a first switch and a second switch coupled to opposed ends of the inductor, the first switch and the second switch switchable between a non-conductive state and a conductive state to control current flow through the inductor and produce a first output voltage at the first output node and a second output voltage at the second output node;
   current sensing circuitry sensitive to a current intensity through the inductor and configured to compare the current intensity sensed with at least one reference value; and
   switching control circuitry coupled with the first switch and the second switch, with the first output node and the second output node, and with the current sensing circuitry, wherein the switching control circuitry comprises a timer circuit configured to produce a timing signal with a timing frequency, and wherein the switching control circuitry is configured to:
      control a switching frequency of the first switch and the second switch between the non-conductive state and the conductive state as a function of the first output voltage at the first output node, the second output voltage at the second output node, and a result of comparing the current intensity sensed with the at least one reference value;
      compare a value of the switching frequency with the timing frequency to produce a frequency error value;
      generate an integrated frequency error value by integrating the frequency error value; and
      produce the at least one reference value as a function of the integrated frequency error value to maintain a constant value for the switching frequency.

2. The first circuit of claim 1, wherein the timer circuit comprises a programmable timer circuit configured to produce the timing signal with a selectively variable timing frequency.

3. The first circuit of claim 1, wherein:
   the switching control circuitry comprises processing circuitry configured to process the timing signal digitally; and
   the first circuit comprises digital-to-analog converter circuitry to supply to the current sensing circuitry the at least one reference value converted to analog.

4. The first circuit of claim 1, wherein the switching control circuitry is configured to produce the at least one reference value via frequency-locked-loop processing of the timing signal from the timer circuit.

5. The first circuit of claim 4, wherein the frequency-locked-loop processing comprises:
   receiving the switching frequency value to switch the first switch and the second switch between the non-conductive state and the conductive state as a function of the first output voltage at the first output node and the second output voltage at the second output node.

6. The first circuit of claim 5, wherein the switching control circuitry is configured to produce the at least one reference value via the frequency-locked-loop processing of the timing signal from the timer circuit combined with feedforward processing of the first output voltage at the first output node and the second output voltage at the second output node.

7. The first circuit of claim 6, wherein the feedforward processing comprises:
   producing, during a cycle of the switching frequency of the first switch and the second switch between the non-conductive state and the conductive state, a count of undervoltage events wherein the first output voltage at the first output node and the second output voltage at the second output node are under respective voltage references; and
   producing the at least one reference value as a function of the integrated frequency error value and the count.

8. The first circuit of claim 1, wherein the switching control circuitry is configured to:
   produce as a function of the timing signal from the timer circuit a first reference value and a second reference value for comparison with the current intensity sensed in the inductor; and
   control the switching frequency of the first switch and the second switch between the non-conductive state and the conductive state as a function of the first output voltage at the first output node, the second output voltage at the second output node and the result of comparing the current intensity sensed with the first reference value and the second reference value.

9. The first circuit of claim 8, wherein the switching control circuitry comprises a first processing branch configured to produce the first reference value as a function of the timing signal from the timer circuit and a second processing branch configured to produce the second reference value as a function of the timing signal from the timer circuit, and either one of, alternatively:
   a first signal propagation path to apply to the current sensing circuitry the first reference value for comparison with the current intensity through the inductor and a second signal propagation path to apply to the current sensing circuitry the second reference value for comparison with the current intensity through the inductor; or a common signal propagation path to apply to the current sensing circuitry for comparison with the current intensity through the inductor the first reference value alternated with the second reference value.

10. The first circuit of claim 9, wherein the first and second signal propagation paths comprise or the common signal propagation path comprises:

digital-to-analog converter circuitry to supply the current sensing circuitry with analog-converted signals.

11. The first circuit of claim 1, further comprising:

a first diode arranged between the first output node and a first node of the inductor; and a second diode arranged between the second output node and a second node of the inductor.

12. A device, comprising:

a first circuit, comprising:
   at least one pair of output nodes, the pair of output nodes comprising a first output node and a second output node with an inductor arranged intermediate therebetween;
   current drive circuitry comprising a first switch and a second switch coupled to opposed ends of the inductor, the first switch and the second switch switchable between a non-conductive state and a conductive state to control current flow through the inductor and produce a first output voltage at the first output node and a second output voltage at the second output node;
   current sensing circuitry sensitive to a current intensity through the inductor and configured to compare the current intensity sensed with at least one reference value; and
   switching control circuitry coupled with the first switch and the second switch, with the first output node and the second output node, and with the current sensing circuitry, wherein the switching control circuitry comprises a timer circuit configured to produce a timing signal with a timing frequency, and wherein the switching control circuitry is configured to:
      control a switching frequency of the first switch and the second switch between the non-conductive state and the conductive state as a function of the first output voltage at the first output node, the second output voltage at the second output node, and a result of comparing the current intensity sensed with the at least one reference value;
      compare a value of the switching frequency with the timing frequency to produce a frequency error value;
      generate an integrated frequency error value by integrating the frequency error value; and
      produce the at least one reference value as a function of the integrated frequency error value to maintain a constant value for the switching frequency; and
   at least one pair of electrical loads coupled to the first output node and to the second output node, respectively.

13. The device of claim 12, wherein the switching control circuitry is configured to produce the at least one reference value via frequency-locked-loop processing of the timing signal from the timer circuit.

14. The device of claim 13, wherein the frequency-locked-loop processing comprises:

receiving a switching frequency value to switch the first switch and the second switch between the non-conductive state and the conductive state as a function of the first output voltage at the first output node and the second output voltage at the second output node.

15. The device of claim 14, wherein the switching control circuitry is configured to produce the at least one reference value via the frequency-locked-loop processing of the timing signal from the timer circuit combined with feedforward processing of the first output voltage at the first output node and the second output voltage at the second output node.

16. The device of claim 15, wherein the feedforward processing comprises:

producing, during a cycle of the switching frequency of the first switch and the second switch between the non-conductive state and the conductive state, a count of undervoltage events wherein the first output voltage at the first output node and the second output voltage at the second output node are under respective voltage references; and producing the at least one reference value as a function of the integrated frequency error value and the count.

17. The device of claim 12, wherein the first circuit further comprises:

a first diode arranged between the first output node and a first node of the inductor; and a second diode arranged between the second output node and a second node of the inductor.

18. A method of operating a first circuit comprising at least one pair of output nodes, the pair of output nodes comprising a first output node and a second output node with an inductor arranged intermediate therebetween, current drive circuitry comprising a first switch and a second switch coupled to opposed ends of the inductor, current sensing circuitry, and switching control circuitry coupled with the first switch and the second switch, with the first output node and the second output node, and with the current sensing circuitry, and comprising a timer circuit, the method comprising:

producing, by the timer circuit, a timing signal with a timing frequency;

sensing, by the current sensing circuitry, a current intensity through the inductor;

comparing, by the current sensing circuitry, the sensed current intensity with at least one reference value;

controlling, by the switching control circuitry, a switching frequency of the first switch and the second switch between a non-conductive state and a conductive state as a function of a first output voltage at the first output node, a second output voltage at the second output node, and the comparing the sensed current intensity with the at least one reference value;

comparing, by the switching control circuitry, a value of the switching frequency with the timing frequency to produce a frequency error value;

generating, by the switching control circuitry, an integrated frequency value by integrating the frequency error value;

producing, by the switching control circuitry, the at least one reference value as a function of the integrated frequency error value to maintain a constant value for the switching frequency; and setting, by the switching control circuitry, the timing frequency of the timing signal lower than an upper frequency bound of the current drive circuitry for switching the first and second switches between the non-conductive state and the conductive state to control a current flow through the inductor.

19. The method of claim 18, wherein producing further comprises producing, by the switching control circuitry, the at least one reference value via frequency-locked-loop processing of the timing signal.

20. The method of claim 19, wherein the frequency-locked-loop processing comprises:
receiving a switching frequency value to switch the first switch and the second switch between the non-conductive state and the conductive state as a function of the first output voltage at the first output node and the second output voltage at the second output node.

21. The method of claim 20, wherein the producing further comprises producing, by the switching control circuitry, the at least one reference value via the frequency-locked-loop processing of the timing signal combined with feedforward processing of the first output voltage and the second output voltage.

22. The method of claim 21, wherein the feedforward processing comprises:
producing, during a cycle of the switching frequency of the first switch and the second switch between the non-conductive state and the conductive state, a count of undervoltage events, the first output voltage at the first output node and the second output voltage at the second output node being under respective voltage references; and
producing the at least one reference value as a function of the integrated frequency error value and the count.

23. The method of claim 18, wherein the first circuit further comprises:
a first diode arranged between the first output node and a first node of the inductor; and
a second diode arranged between the second output node and a second node of the inductor.

24. A first circuit, comprising:
at least one pair of output nodes, the pair of output nodes comprising a first output node and a second output node coupled through respective diodes to opposite ends of an inductor;
current drive circuitry comprising a first switch and a second switch coupled to opposed ends of the inductor, the first switch and the second switch switchable between a non-conductive state and a conductive state to control current flow through the inductor and produce a first output voltage at the first output node and a second output voltage at the second output node;
current sensing circuitry sensitive to a current intensity through the inductor and configured to compare the current intensity sensed with at least one reference value; and
switching control circuitry coupled with the first switch and the second switch, with the first output node and the second output node, and with the current sensing circuitry, wherein the switching control circuitry comprises a timer circuit configured to produce a timing signal with a timing frequency, and wherein the switching control circuitry is configured to:
control a switching frequency of the first switch and the second switch between the non-conductive state and the conductive state as a function of the first output voltage at the first output node, the second output voltage at the second output node, and a result of comparing the current intensity sensed with the at least one reference value;
compare a value of the switching frequency with the timing frequency to produce a frequency error value;
generate an integrated frequency error value by integrating the frequency error value; and
produce the at least one reference value as a function of the integrated frequency error value to maintain a constant value for the switching frequency.

* * * * *